(12) United States Patent
Perkins et al.

(10) Patent No.: US 12,079,982 B2
(45) Date of Patent: Sep. 3, 2024

(54) OBJECT DEFECT DETECTION

(71) Applicant: Verizon Media Inc., New York, NY (US)

(72) Inventors: Kevin Andrew Perkins, Champaign, IL (US); Ashwini Kumar Kounduri, Urbana, IL (US)

(73) Assignee: Yahoo Ad Tech LLC, New York, NY (US)

( * ) Notice: Subject to any disclaimer, the term of this patent is extended or adjusted under 35 U.S.C. 154(b) by 338 days.

(21) Appl. No.: 17/528,238

(22) Filed: Nov. 17, 2021

(65) Prior Publication Data

US 2023/0153987 A1    May 18, 2023

(51) Int. Cl.
*G06T 7/00* (2017.01)
*G06T 7/11* (2017.01)
*G06T 7/64* (2017.01)

(52) U.S. Cl.
CPC ............. *G06T 7/001* (2013.01); *G06T 7/11* (2017.01); *G06T 7/64* (2017.01); *G06T 2207/20081* (2013.01); *G06T 2207/30164* (2013.01)

(58) Field of Classification Search
CPC ... G06T 7/001; G06T 7/64; G06T 7/11; G06T 2207/20081; G06T 2207/30164
See application file for complete search history.

(56) References Cited

U.S. PATENT DOCUMENTS

| | | | | |
|---|---|---|---|---|
| 8,233,690 B2 * | 7/2012 | Ng | .......................... | A61B 6/025 |
| | | | | 382/254 |
| 10,891,508 B2 * | 1/2021 | Fujimori | ................ | G01N 21/89 |
| 11,030,738 B2 * | 6/2021 | Li | ......................... | G06V 10/993 |
| 11,035,802 B2 * | 6/2021 | Chen | ..................... | G06T 7/0004 |
| 11,158,039 B2 * | 10/2021 | Michael | .................... | G06T 7/75 |
| 11,199,506 B2 * | 12/2021 | Shaubi | ................. | G06T 7/0004 |
| 11,341,627 B2 * | 5/2022 | Sarkisian | ............... | G06N 20/00 |
| 11,443,079 B2 * | 9/2022 | Ganihar | .................. | G06T 17/10 |
| 11,823,433 B1 * | 11/2023 | Paz-Perez | ............. | G06F 18/214 |

* cited by examiner

*Primary Examiner* — Gregory M Desire
(74) *Attorney, Agent, or Firm* — Cooper Legal Group LLC (57) ABSTRACT

One or more computing devices, systems, and/or methods for defect detection are provided. An image, depicting an object for evaluation to determine whether the object has a defect, is inputted into a segmentation model to identify an object region of interest of the object. An object region area of the object region of interest is calculated. A convex hull area of a convex hull encompassing the object region of interest is calculated. A ratio of the object region area to the convex hull area is determined. The ratio is compared to a threshold to determine whether the object has the defect or does not have the defect.

20 Claims, 9 Drawing Sheets

OBJECT DEFECT DETECTION

BACKGROUND

During manufacturing or operation of products, defects can occur. For example, during manufacturing of a product that includes screws (e.g., screw used to secure parts of a computer together), a screw may become stripped during installation of the screw in the product. In another example, a cable that is to plug into a connector may experience an installation defect where the cable is not fully plugged into the connector. It may be impossible to manually inspect each product in order to identify defects, especially when there may be a large number of products being manufactured.

SUMMARY

In accordance with the present disclosure, one or more computing devices and/or methods for object defect detection are provided. A segmentation model may be trained to determine whether an object, depicted within images, has a defect. The defect may correspond to a stripped screw, a cable that is not fully connected, a chip, a dent, missing material, a missing part, a label or part that is not aligned or installed in the correct location, or other type of defect. In some embodiments, the segmentation model may be trained using sparse training data of training images labeled as either having the defect or not having the defect. In some embodiments, the sparse training data may have less than a threshold amount of training images (e.g., less than a thousand or any other number of training images labeled as depicting a defective or non-defective object). In some embodiments, image augmentation may be applied to the training images and/or the segmentation in order to generate augmented training images and/or segmentations that may be used to improve the accuracy of the segmentation model notwithstanding the relatively sparse/small amount of initial training data (e.g., a hundred training images may be transformed into thousands of augmented training images).

Once trained, the segmentation model may evaluate images to determine whether the images depict objects with defects for not. For example, an image may depict an object for evaluation as to whether the object has a defect, such as whether the image depicts a screw with a stripped screw head. Accordingly, the image may be input into the segmentation model. A screw head of the screw may be an object region of interest for determining whether the screw has a defect of a stripped screw head. The segmentation model may make a prediction for each pixel in the image as to whether the pixel is part of the object region of interest, such as whether each pixel depicts the screw head of the screw. In this way, a segmentation mask or other type of output is created to identify the pixels that are predicted by the segmentation model as being part of the object region of interest, such as pixels depicting the screw head.

Post processing is applied to the output of the segmentation model such as upon the segmentation mask identifying the object region of interest. An object region area may be calculated for the object region of interest. In some embodiments, the object region area may correspond to a number of pixels comprised within the object region of interest identified by the segmentation model (e.g., an area or number of pixels labeled by the segmentation model as being part of the screw head). A convex hull encompassing the object region of interest may be identified. The convex hull may be a shape just large enough to encompass the object region of interest without cutting into the object region of interest. A convex hull area of the convex hull may be calculated. In some embodiments, the convex hull area may correspond to a number of pixels comprised within the convex hull. A ratio of the object region area to the convex hull area may be calculated. The ratio may be compared to a threshold to determine whether the object has the defect or not. In an example, if the ratio indicates that the object region area is a threshold amount similar to the convex hull area, then the screw head may be determined as having the defect of being a stripped screw head that is relatively convex (e.g., a stripped screw head is relatively convex). If the ratio indicates that the object region area is not a threshold amount similar to the convex hull area, then the screw head may be determined as not having the defect of being a stripped screw head because the screw head is relatively non-convex (e.g., a cross shape is relatively non-convex).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
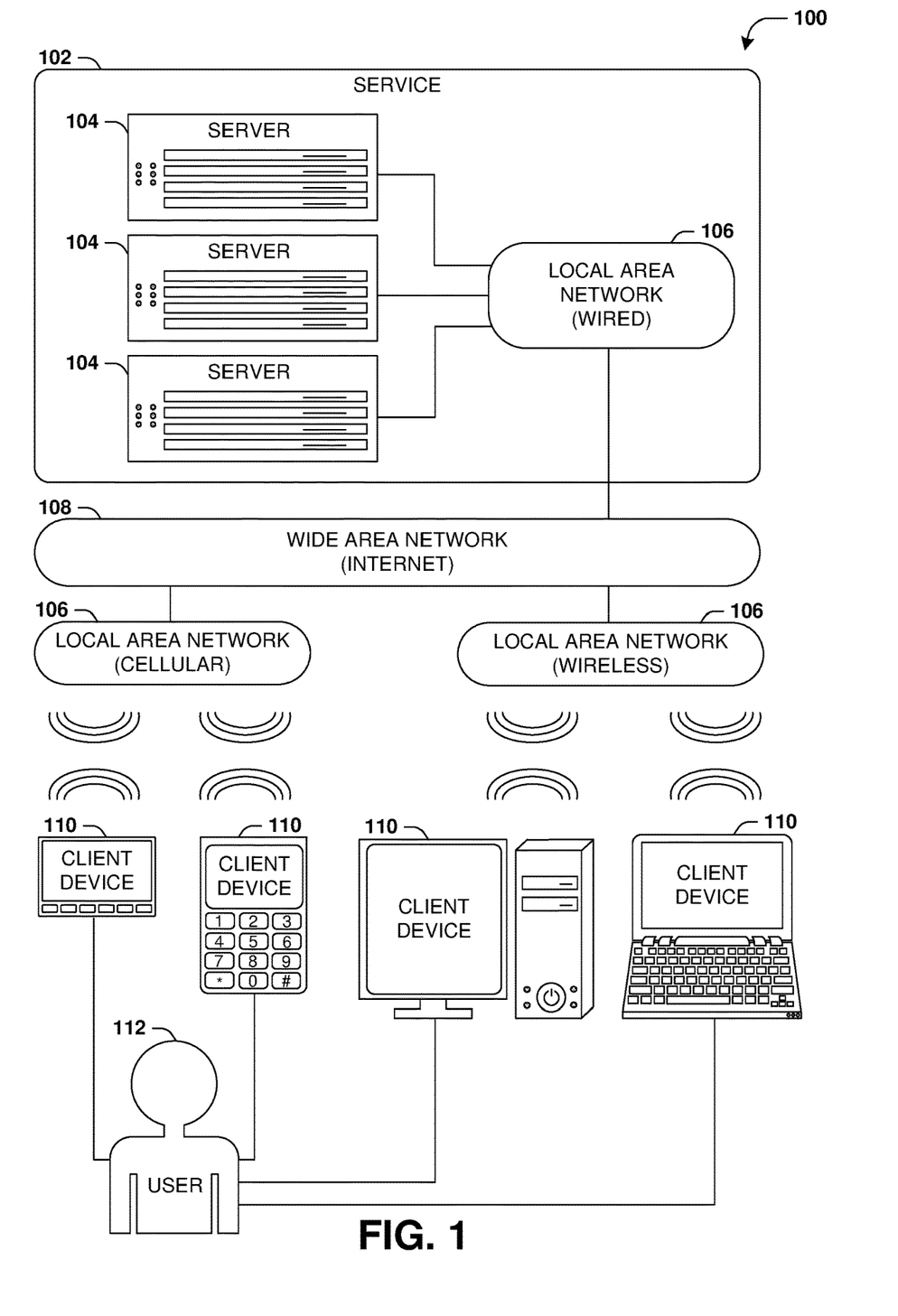
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
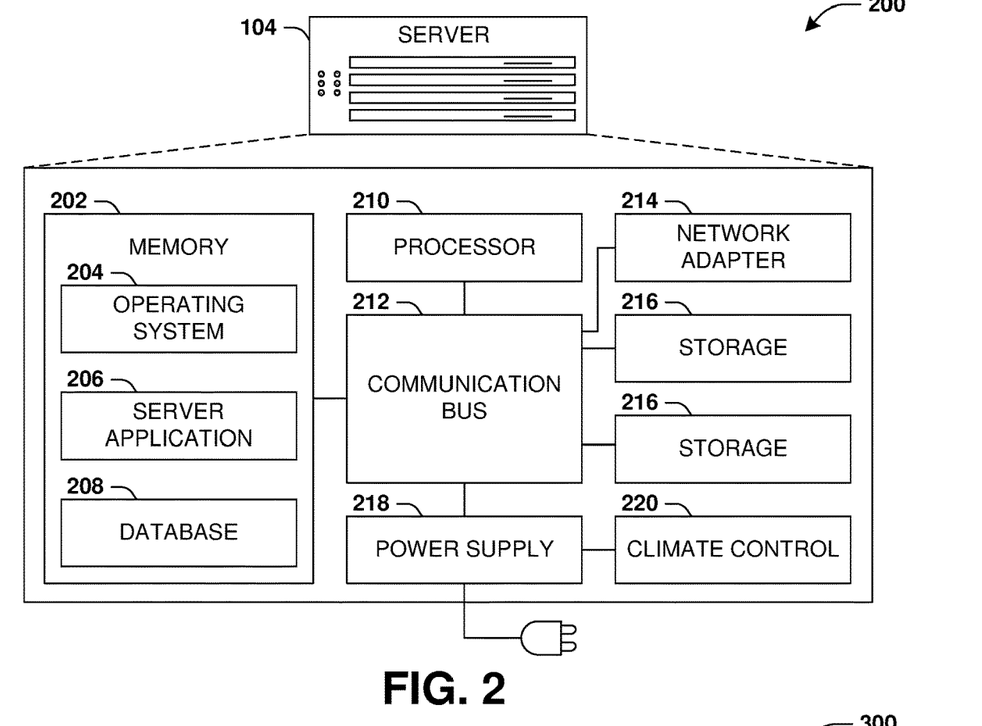
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
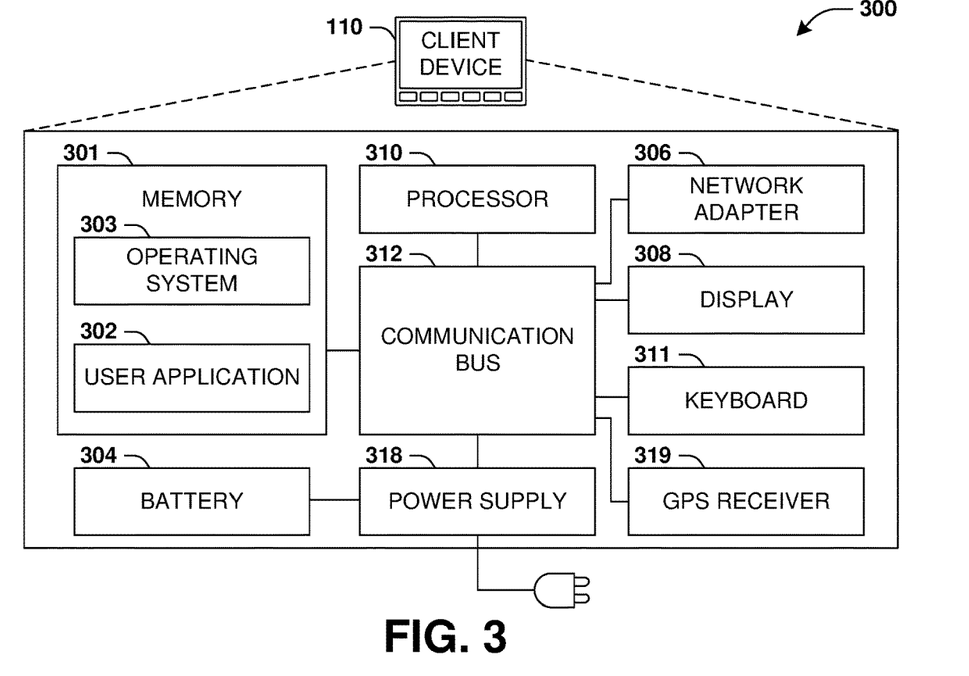
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for object defect identification are provided. Objects may have various types of defects, which may occur during manufacturing or use of the objects. For example, a screw may have a stripped screw head, a cable may have an install defect of not being properly connected to a connector, a label may be incorrectly positioned on a product, a toy may have a crack or dent, a product may have a missing part, etc. If there is a large number of objects to inspect for defects such as during manufacturing of the objects, then it may be impractical for humans to manually inspect the objects for defects.

A machine learning model may be trained to label images as either depicting an object with a defect or depicting an object without the defect. Classification machine learning models may require thousands of training images manually labeled as depicting an object with or without the defect in order to accurately determine whether input images depict the object with or without the defect. Unfortunately, there may only be a sparse training set of training images for training a classification machine learning model (e.g., 100 images and only 15 images depict a screw with a stripped screw head). Thus, the classification machine learning model cannot be adequately trained using the sparse training set of training images to accurately determine whether input images depict the object with or without the defect. For example, the classification machine learning model may merely memorize the 15 images depicting the screw with the stripped screw head, and thus suffers from overfitting. Additionally, manually acquiring and labeling thousands of images of screws with and without stripped screw heads may be impractical.

Accordingly, as provided herein, a segmentation model and post processing are used to determine whether images depict an object with a defect or without the defect. In some embodiments, the segmentation model may be trained on a sparse training set of training images labeled as either depicting an object with the defect or within the defect (e.g., less than a threshold number of training images such as less than a thousand training images, less than a few hundred training images, or any other number of training images). In some embodiments, the segmentation model may be trained on any number of training images, as is not limited to being trained on a sparse training set of training images. In some embodiments, the segmentation model is trained to identify an object region of interest of the object, such as to output predictions for each pixel within an image as to whether each pixel is part of the object region of interest (e.g., part of a screw head of the screw) or not part of the object region of interest (e.g., not part of the screw head).

Once the segmentation model has identified the object region of interest in the image, then post processing is performed to transform the output of the segmentation model (e.g., a segmentation mask indicating which pixels are part of the screw head and which pixels are not) into a label as to whether the object depicts a screw head with or without a stripped screw head. The post processing may calculate an object region area for the object region of interest. In some embodiments, the object region area may correspond to a number of pixels comprised within the object region of interest identified by the segmentation model (e.g., an area of pixels labeled by the segmentation model as being part of the screw head). The post processing may identify a convex hull encompassing the object region of interest, such as by using image processing functionality. The post processing may calculate a convex hull area of the convex hull. In some embodiments, the convex hull area may correspond to a number of pixels comprised within the convex hull. The post processing may calculate a ratio of the object region area to the convex hull area.

The post processing may compare the ratio to a threshold to determine whether the object has the defect or not. In an example, if the ratio indicates that the object region area is a threshold amount similar to the convex hull area, then the screw head has the defect of being a stripped screw head that is relatively convex (e.g., a stripped screw head is relatively convex). If the ratio indicates that the object region area is not a threshold amount similar to the convex hull area, then the screw head does not the defect of being a stripped screw head because the screw head is relatively non-convex (e.g., a cross shape of a non-stripped screw head is relatively non-convex).

Various actions may be triggered if a defect is detected. For example, a description of the defect may be generated and displayed on a computing device. In another example, instructions for how to address/fix the defect may be generated and displayed on the computing device (e.g., instructions for how to remove and replace a screw with a stripped screw head, instructions for how to connect a cable that is not fully plugged in, instructions for locating and replacing/installing a missing part, instructions to discard a dented object, instructions for where to reinstall a misaligned label, etc.). In another example, the object may be marked as defective and replacement of the object may be facilitated. In another example, a machine (e.g., a factory machine such as a robotic arm) is controlled to discard the object, replace the object with a replacement object, or correct the defect, such as where commands are sent to the machine to remove and replace the defective screw, realign a part, etc.

Figure 4:
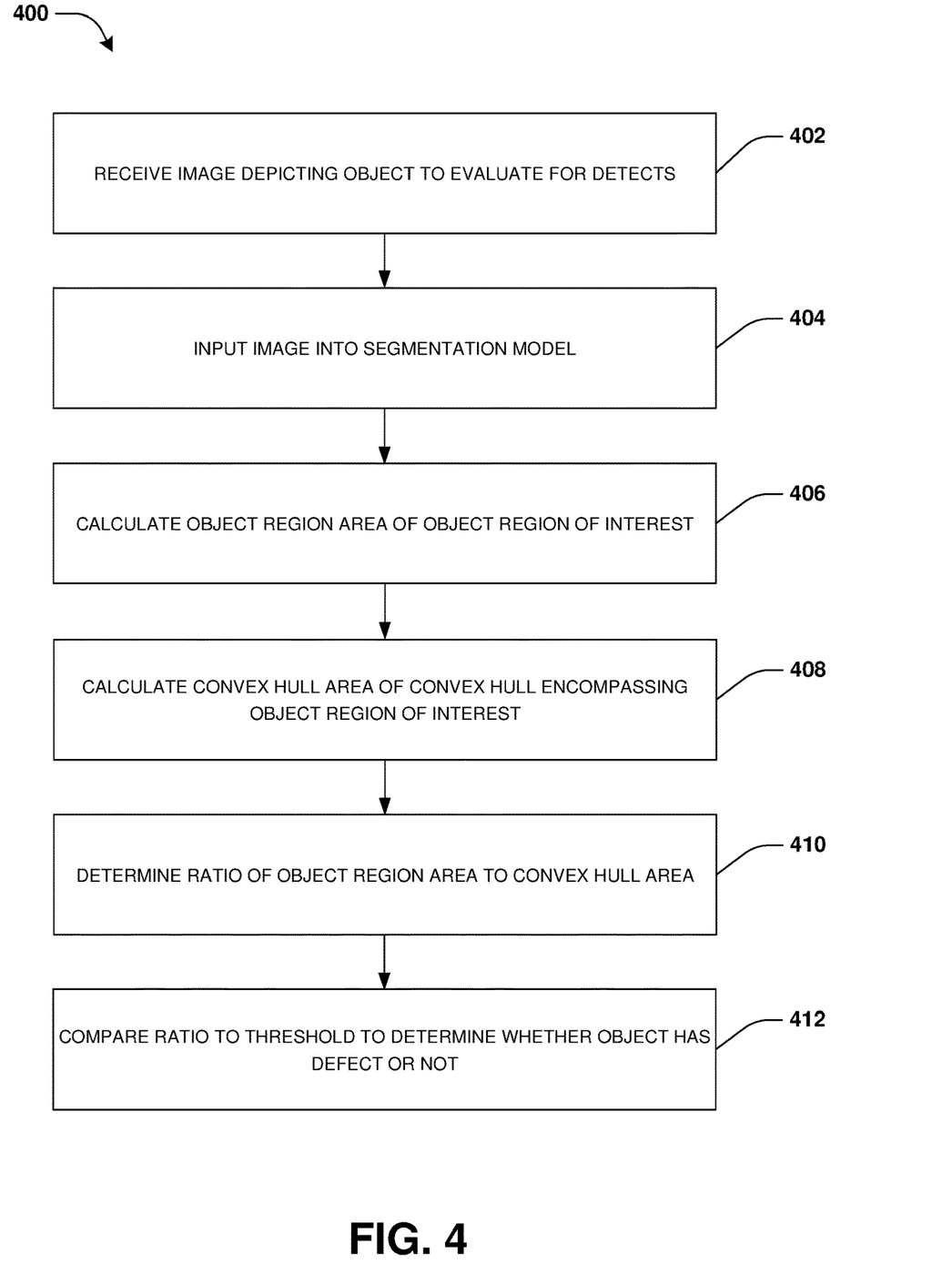
FIG. 4 is a flow chart illustrating an example method for object defect detection.
Figure 5:
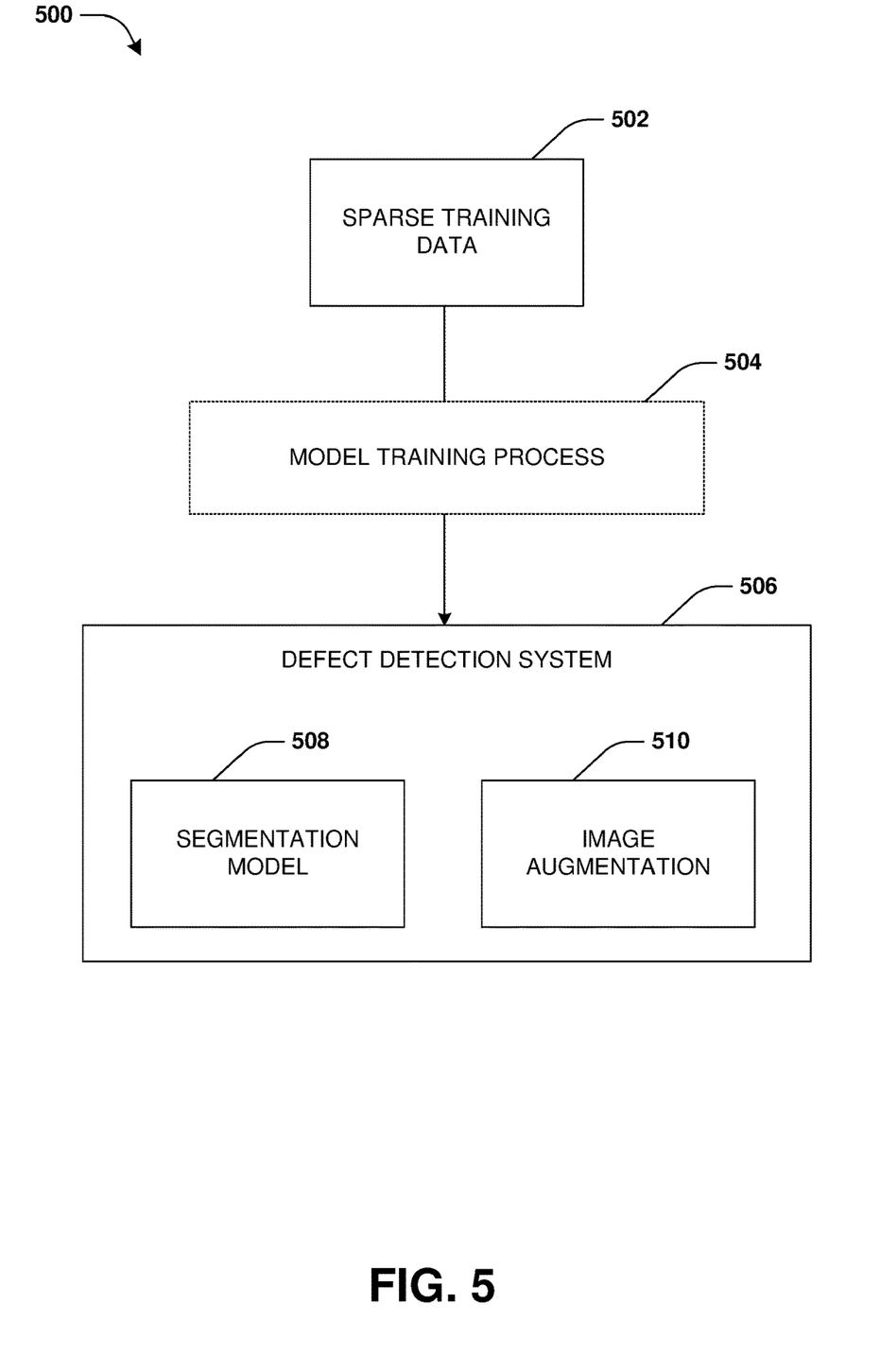
FIG. 5 is a component block diagram illustrating an example system for training a segmentation model.

One embodiment of object defect detection is illustrated by an exemplary method 400 of FIG. 4 and is further described in conjunction with systems 500, 600, 700, 800, and 900 of FIGS. 5-9. The method 400 may utilize a segmentation model 508 of a defect detection system 506 for object defect detection. FIG. 5 illustrates the segmentation model 508 of the defect detection system 506 being trained by a model training process 504 in order to predict whether pixels are part of an object region of interest of an object having a defect or not having a defect. In some embodiments, the model training process 504 may perform a binary segmentation technique to train the segmentation model 508 using sparse training data 502 of training images labeled as either having the defect or not having the defect within the object region of interest.

Because the sparse training data 502 may have a limited number of training images (e.g., as opposed to thousands of training images that could be used to train a classification machine learning model), image augmentation 510 may be implemented by the modeling training process 504 in order to generate augmented training images for further training the segmentation model 508. For example, the image augmentation 510 may be performed upon a training image in order to rotate the training image, crop the training image, move the training image around, and/or perform a variety of other modifications to the training image in order to generate a plurality of augmented training images. This may be performed for each of the training images within the sparse training data 502 in order to generate a significant number of augmented training images for further training the segmentation model 508 for making accurate predictions as to whether pixels of an input image are part of an object region of interest of an object with a defect or without a defect. The image augmentation 510 may also be performed upon ground truth segmentation masks or other output or segmentation of the segmentation model 508 in order to further train the segmentation model 508. In some embodiments, the segmentation model 508 may be applied to the augmented training images to generate predicted segmentation masks for the augmented training images. The image augmentation may be applied to ground truth segmentation masks for training the segmentation model 508.

In some embodiments, the segmentation model 508 may be trained using a two-pass model training technique, such as for training the segmentation model 508 to determine whether a first object is connected to a second object (e.g., whether a cable is properly/fully plugged into a connector). A first pass may be performed by the segmentation model 508 upon the image to estimate a region of a gap between the first object and the second object. A cropped image may be generated based upon the region. For example, the cropped image may depict a zoomed in view of the region encompassing the gap between the first object and the second object, while excluding other portions of the image (e.g., background, additional objects than the first object and the second object, etc.). The cropped image may have a higher resolution than a resolution of the image processed during the first pass. A second pass may be performed by the segmentation model 508 upon the cropped image to generate a prediction at a pixel level as to whether each pixels belongs to the region of the gap or not. If there is a threshold number of pixels within the region of the gap (e.g., there is a large gap between the cable and the connector), then the object may have a defect corresponding to the first object not being connected to the second object (e.g., a gap big enough to indicate that the cable is not fully plugged into the connector). If there is less than the threshold number of pixels within the region of the gap (e.g., there is little or no gap), then the object may be determined as not having the defect (e.g., the cable is fully plugged into the connector).

Once the segmentation model 508 has been trained to detect whether images comprise object regions of interest for objects with and without the defect, the segmentation model 508 and post processing may be used to determine whether input images depict an object with the defect or without the defect.

Figure 6:
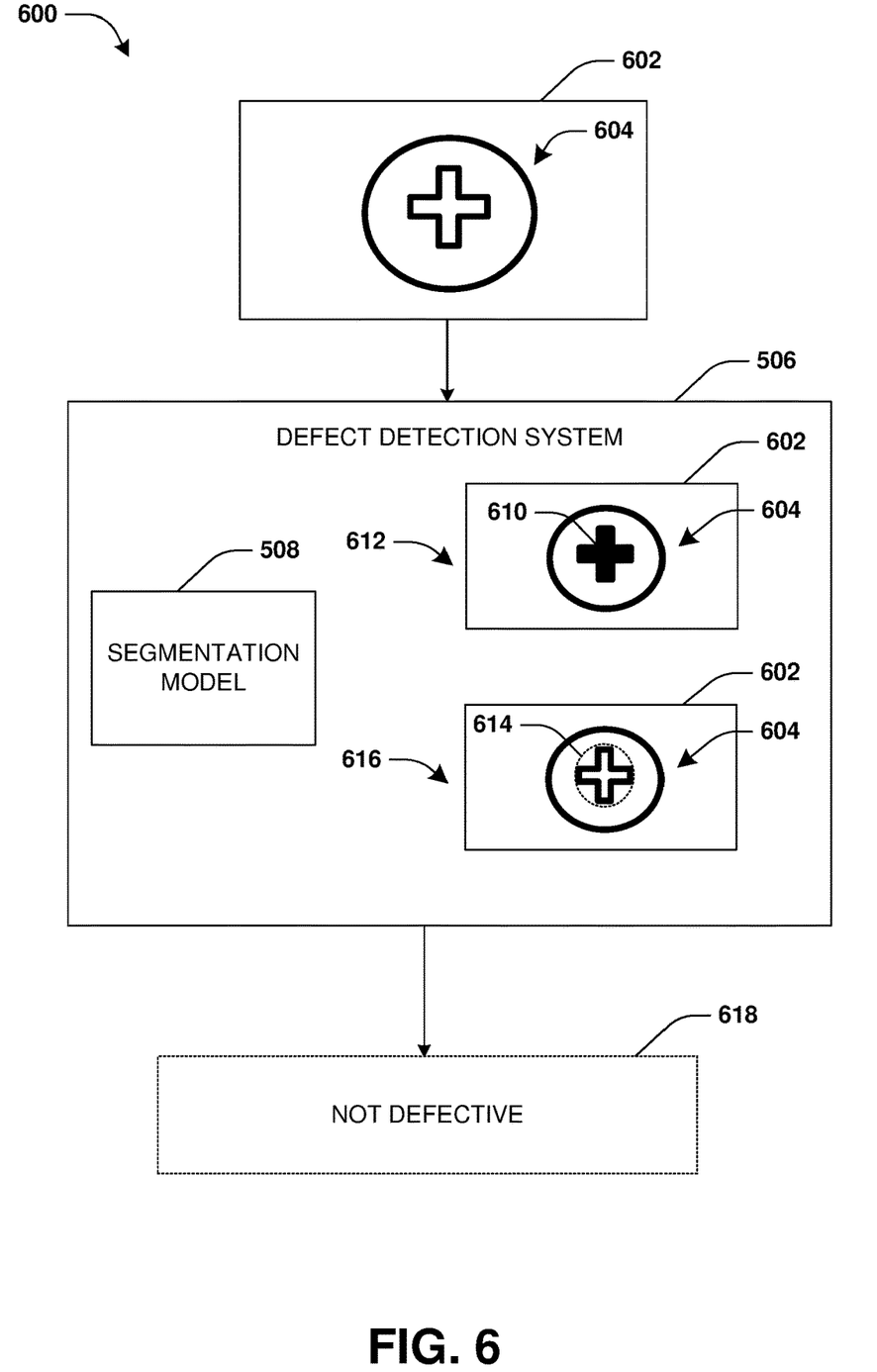
FIG. 6 is a component block diagram illustrating an example system for object defect detection of a screw head.

FIG. 6 illustrates an example of the defect detection system 506 utilizing the segmentation model 508 and post processing 616 to determine whether a screw 604 depicted within an image 602 has a defect of a stripped screw head or not. During operation 402 of method 400, the image 602 depicting the screw 604 may be received by the defect detection system 506. During operation 404 of method 400, the defect detection system 506 may input the image 602 into the segmentation model 508 that has been trained to generation predictions on a per pixel basis as to whether each pixel of an input image depicts (is part of) an object region of interest (e.g., a screw head of the screw 604) of an object with a defect (e.g., a stripped screw head) or without the defect (e.g., a non-stripped and intact screw head). Accordingly, the defect detection system 506 uses the segmentation model 508 to process the image 602 depicting the screw 604.

The segmentation model 508 may generate an output 612, such as a segmentation mask or other output, based upon processing the image 602 depicting the screw 604. For example, the segmentation model 508 may generate a prediction for each pixel within the image 602 as to whether each pixel depicts (is part of) an object region of interest 610 of the screw 604, such as a screw head of the screw 604. In this way, the output 612 from the segmentation model 508 identifies the object region of interest 610 of the screw 604. For illustrative purposes, the object region of interest 610 is illustrated by black shading of the screw head.

In order to determine whether the screw head has the defect, post processing 616 is performed upon the output 612 from the segmentation model 508. In particular, the post processing 616 calculates an object region area of the object region of interest 610, during operation 406 of method 400. In some embodiments, the object region area may correspond to a number of pixels within the object region of interest 610 (e.g., a number of pixels predicted by the segmentation model 508 as depicting the screw head).

During operation 408 of method 400, the post processing 616 may identify a convex hull 614 (e.g., a smallest convex hull) encompassing the object region of interest 610. For example, the convex hull 614 may correspond to a shape just large enough to fully enclose the object region of interest 610 (e.g., fully enclose the screw head) without cutting into the object region of interest 610. The post processing 616 may calculate a convex hull area of the convex hull 614 encompassing the object region of interest 610. In some embodiments, the post processing 616 may calculate the convex hull area of the convex hull 614 as a number of pixels within the convex hull 614.

During operation 410 of method 400, a ratio of the object region area to the convex hull area may be determined by the post processing 616. The ratio may be indicative of a proportion or percentage of pixels that are both part of the object region of interest 610 (e.g., the screw head) and the convex hull 614 to pixels that are merely part of the convex hull 614. The larger the percentage of pixels that are both part of the object region of interest 610 (e.g., the screw head) and the convex hull 614, the more likely the screw 604 has a defect of a stripped screw head because the stripped screw head will be move convex that a non-stripped screw head (e.g., a cross shape of a non-stripped screw head will not be as convex as a stripped screw head).

In some embodiments, the post processing 616 takes the prediction from the segmentation model 508 (e.g., output 612 predicting which pixels are part to the object region of interest 610) as input, and outputs a convexity of the object region of interest 610 (e.g., a convexity of the screw head), which may be reflected as the ratio. The convexity may refer to a decimal between 0.0 (e.g., the prediction by the segmentation model 508 indicates that the object region of interest 610 such as the screw head is entirely non-convex) to 1.0 (e.g., the prediction by the segmentation model 508 indicates that the object region of interest 610 such as the screw head is entirely convex). The decimal (ratio) may be computed by dividing the object region area of the object region of interest 610 by the convex hull area of the convex hull 614. In this way, the decimal represent convexity of the screw head, which may be determined as the ratio by the post processing 716.

During operation 412 of method 400, the ratio may be compared to a threshold to determine whether the screw 604 has the defect of a stripped screw head. For example, the threshold may correspond to a percentage of pixels that are both part of the object region of interest 610 (e.g., the screw head) and the convex hull 614, such that if the ratio exceeds the threshold, then the screw 604 may be determined to have the defect of the stripped screw head. In this example, the ratio may be less than the threshold, which indicates that the percentage of pixels that are both part of the object region of interest 610 (e.g., the screw head) and the convex hull 614 is not enough to indicate that the screw 604 has the defect of the stripped screw head. In this way, the post processing 616 determines that the screw 604, depicted within the image 602, is not defective.

Figure 7:
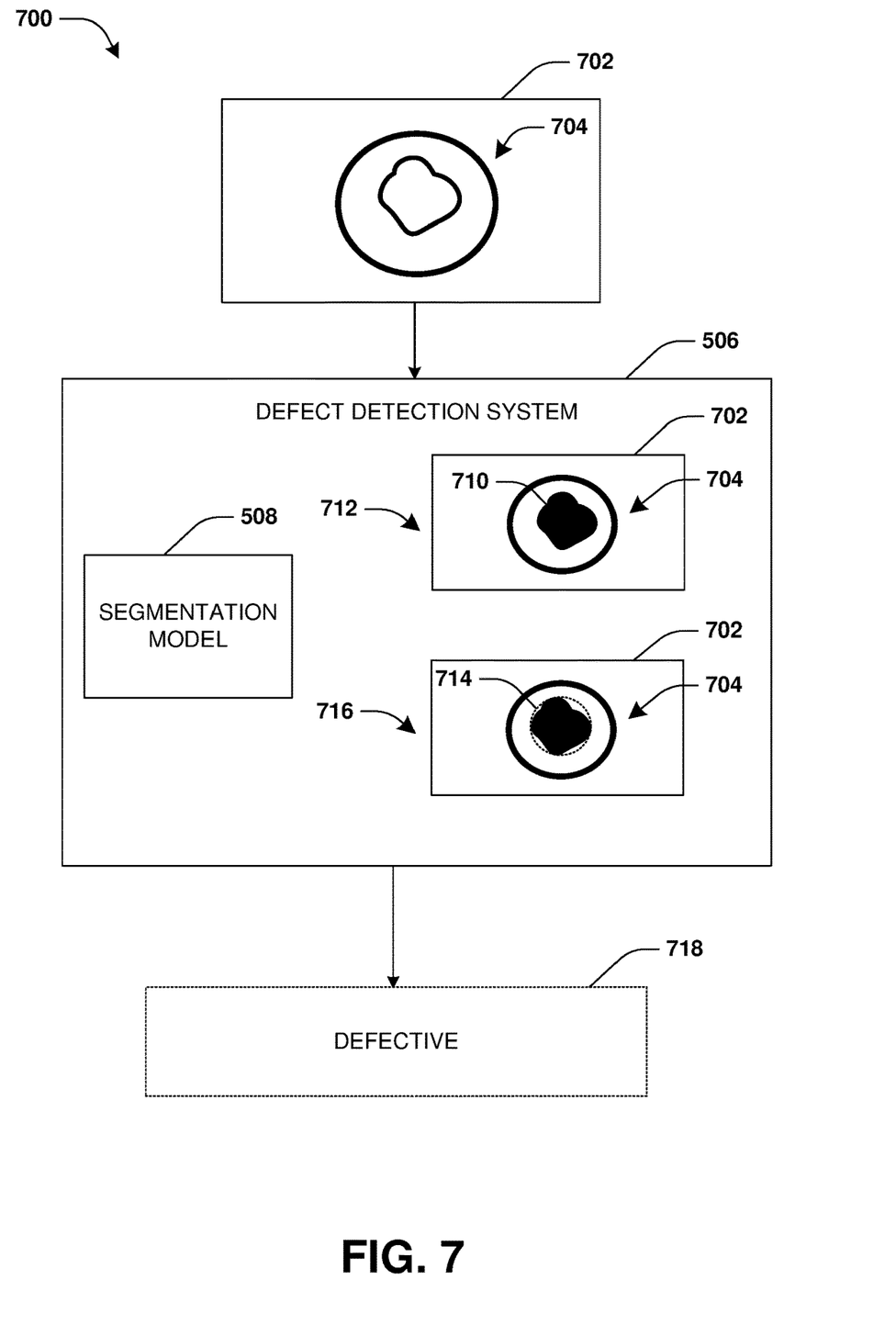
FIG. 7 is a component block diagram illustrating an example system for object defect detection of a screw head.

FIG. 7 illustrates an example of the defect detection system 506 utilizing the segmentation model 508 and post processing 716 to determine whether a screw 704 depicted within an image 702 has a defect of a stripped screw head or not. During operation 402 of method 400, the image 702 depicting the screw 704 may be received by the defect detection system 506. During operation 404 of method 400, the defect detection system 506 may input the image 702 into the segmentation model 508 that has been trained to generation predictions on a per pixel basis as to whether each pixel of an input image depicts (is part of) an object region of interest (e.g., a screw head of the screw 704) of an object with a defect (e.g., a stripped screw head) or without the defect (e.g., a non-stripped and intact screw head). Accordingly, the defect detection system 506 uses the segmentation model 508 to process the image 702 depicting the screw 704.

The segmentation model 508 may generate an output 712, such as a segmentation mask or other output, based upon processing the image 702 depicting the screw 704. For example, the segmentation model 508 may generate a prediction for each pixel within the image 702 as to whether each pixel depicts (is part of) an object region of interest 710 of the screw 704, such as a screw head of the screw 704. In this way, the output 712 from the segmentation model 508 identifies the object region of interest 710 of the screw 704. For illustrative purposes, the object region of interest 710 is illustrated by black shading of the screw head.

In order to determine whether the screw head has the defect, post processing 716 is performed upon the output 712 from the segmentation model 508. In particular, the post processing 716 calculates an object region area of the object region of interest 710, during operation 406 of method 400. In some embodiments, the object region area may correspond to a number of pixels within the object region of interest 710 (e.g., a number of pixels predicted by the segmentation model 508 as depicting the screw head).

During operation 408 of method 400, the post processing 716 may identify a convex hull 714 (e.g., a smallest convex hull) encompassing the object region of interest 710. For example, the convex hull 714 may correspond to a shape just large enough to fully enclose the object region of interest 710 (e.g., fully enclose the screw head) without cutting into the object region of interest 710. The post processing 716 may calculate a convex hull area of the convex hull 714 encompassing the object region of interest 710. In some embodiments, the post processing 716 may calculate the convex hull area of the convex hull 714 as a number of pixels within the convex hull 714.

During operation 410 of method 400, a ratio of the object region area to the convex hull area may be determined by the post processing 716. The ratio may be indicative of a proportion or percentage of pixels that are both part of the object region of interest 710 (e.g., the screw head) and the convex hull 714 to pixels that are merely part of the convex hull 714. The larger the percentage of pixels that are both part of the object region of interest 710 (e.g., the screw head) and the convex hull 714, the more likely the screw 704 has a defect of a stripped screw head because the stripped screw head will be move convex that a non-stripped screw head (e.g., a cross shape of a non-stripped screw head will not be as convex as a stripped screw head).

In some embodiments, the post processing 716 takes the prediction from the segmentation model 508 (e.g., output 712 predicting which pixels are part to the object region of interest 710) as input, and outputs a convexity of the object region of interest 710 (e.g., a convexity of the screw head), which may be reflected as the ratio. The convexity may refer to a decimal (e.g., the ratio) between 0.0 (e.g., the prediction by the segmentation model 508 indicates that the object region of interest 710 such as the screw head is entirely non-convex) to 1.0 (e.g., the prediction by the segmentation model 508 indicates that the object region of interest 710 such as the screw head is entirely convex). The decimal may be computed by dividing the object region area of the object region of interest 710 by the convex hull area of the convex hull 714. In this way, the decimal represent convexity of the screw head, which may be determined as the ratio by the post processing 716.

During operation 412 of method 400, the ratio may be compared to a threshold to determine whether the screw 704 has the defect of a stripped screw head. For example, the threshold may correspond to a percentage of pixels that are both part of the object region of interest 710 (e.g., the screw head) and the convex hull 714, such that if the ratio exceeds the threshold, then the screw 704 may be determined to have the defect of the stripped screw head. In this example, the ratio may exceed the threshold, which indicates that the percentage of pixels that are both part of the object region of interest 710 (e.g., the screw head) and the convex hull 714 is enough to indicate that the screw 704 has the defect of the stripped screw head. In this way, the post processing 716 determines that the screw 704, depicted within the image 702, is defective.

In response to determining that the screw 704 is defective, the defect detection system 506 may implement various remedial actions to address the defect. For example, a description of the defected may be generated and displayed on a computing device. In another example, instructions for how to address/fix the defect may be generated and displayed on the computing device (e.g., instructions for how to remove and replace the screw 704 with a stripped screw head). In another example, the screw 704 and/or object comprising the screw may be marked as defective and replacement of the screw 704 and/or object may be facilitated. In another example, a machine (e.g., a factory machine such as a robotic arm) is controlled to discard the screw 704 and/or object, replace the screw 704 and/or object with a replacement the screw 704 and/or object, or correct the defect, such as where commands are sent to the machine to remove and replace the defective screw.

Various other types of defects may be identified for different types of objects.

Figure 8:
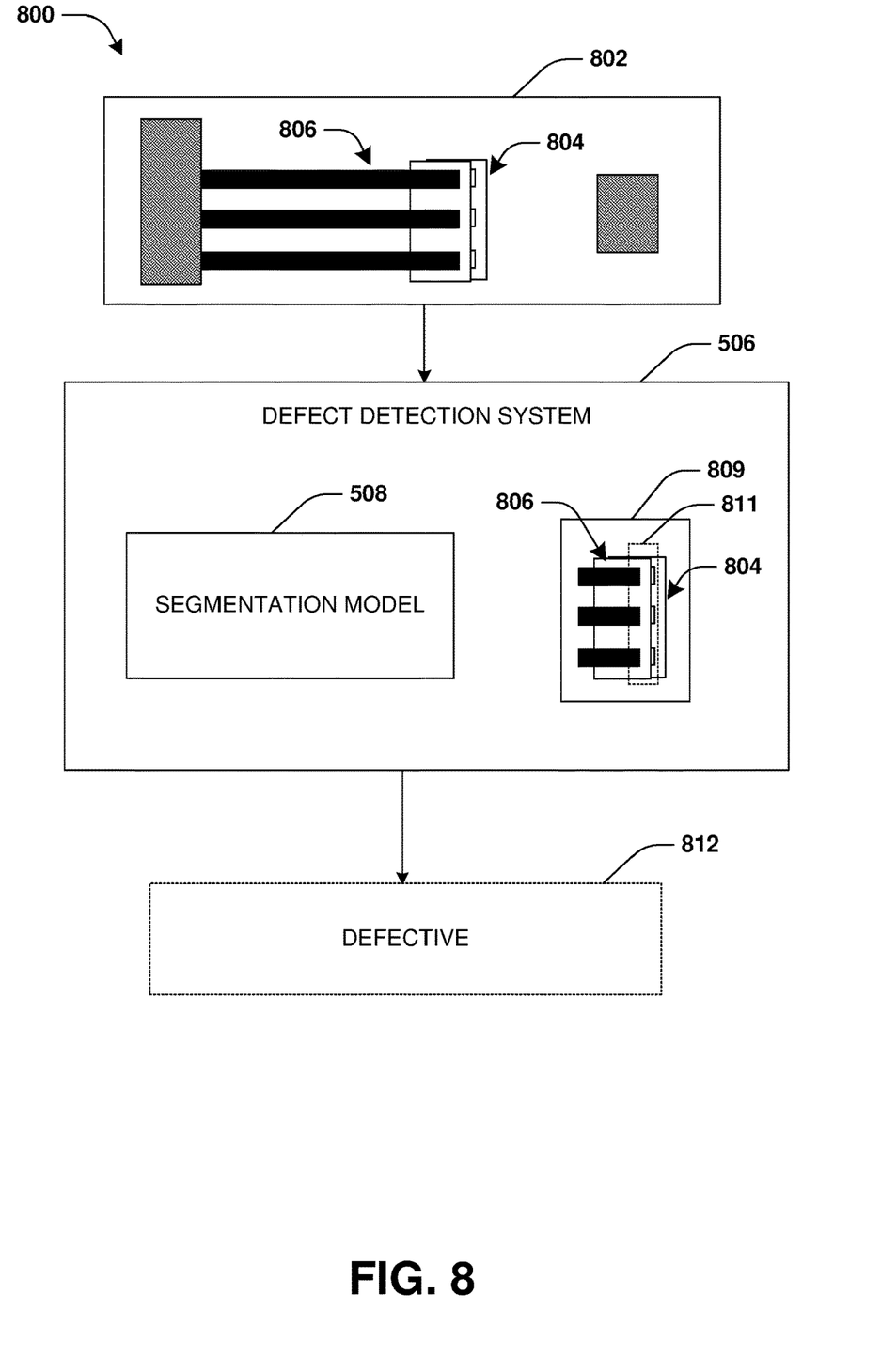
FIG. 8 is a component block diagram illustrating an example system for object defect detection of a cable and connector.

FIG. 8 illustrates an example of the defect detection system 506 utilizing the segmentation model 508 to evaluate an image 802 depicting a cable 806 and a connector 804 to determine whether the cable 806 has a defect of not being fully connected (plugged into) the connector 804. The segmentation model 508 may perform a first pass to estimate a region 811 of a gap between the cable 806 and the connector 804. A cropped image 809 may be generated based upon the region 811 of the gap. The cropped image 809 may correspond to a zoomed in view of the region 811. The segmentation model 508 may perform a second pass upon the cropped image 809 to generate a prediction at a pixel level as to whether pixels belong to the region 811 of the gap. The more pixels that below to the region 811 of the gap compared to pixels that do not, the more likely the cable 806 and the connector 804 have a defect 812 of not being fully connected.

In some embodiments, an image may be evaluated to determine that an object depicted in the image is a first type of object (e.g., a screw, a bolt, or any other object that will be more convex if defective) and that a first type of defect is to be detected (e.g., a stripped screw head or stripped bolt head). The first type of object and/or the first type of defect may correspond to where the more similar an object region area is to a convex hull area (e.g., the ratio exceeding the threshold, and thus having high convexity), the more likely the object has the defect. Accordingly, the object may be identified as having the defect within the object region of interest based upon the ratio exceeding the threshold. An example of detecting this type of defect has been described in relation to FIG. 7.

In contrast, an image may be evaluated to determine that an object depicted in the image is a second type of object (e.g., a jar, a bucket, a container, a housing, a laptop, a phone, a watch, a toy, or any other object that may be composed of a material or part that could have a defect of being dented, chipped, missing, etc.) and that a second type of defect is to be detected (e.g., a dent, a missing part, missing material, a chip, etc.). The second type of object and/or the second type of defect may correspond to where the more dissimilar an object region area is to a convex hull area (e.g., the ratio not exceeding the threshold, and thus having low convexity), the more likely the object has the defect. Accordingly, the object may be identified as having the defect within the object region of interest based upon the ratio not exceeding the threshold (e.g., a portion of the object has been chipped off, and thus has lower convexity). An example of detecting this type of defect is illustrated by FIG. 9.

Figure 9:
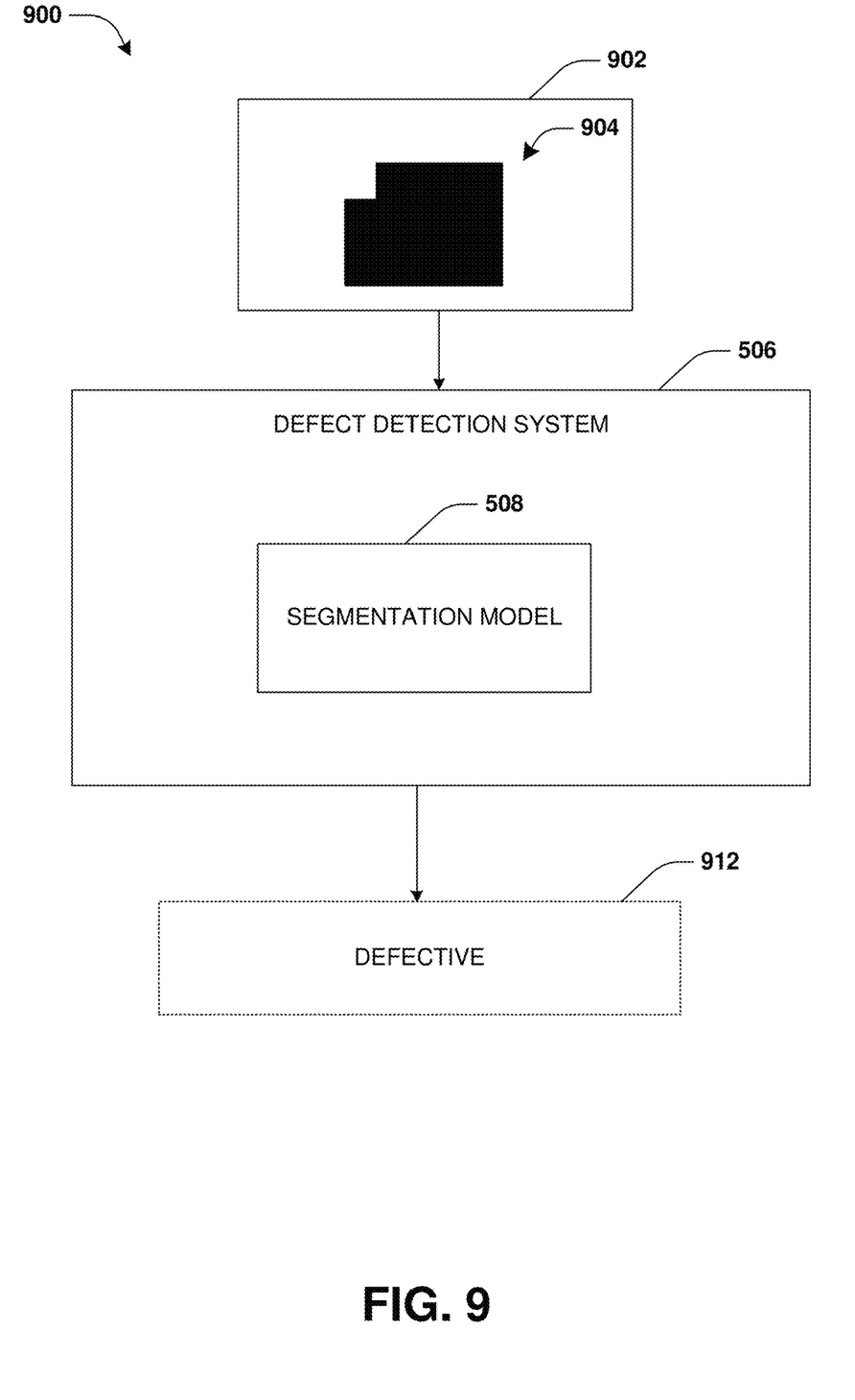
FIG. 9 is a component block diagram illustrating an example system for object defect detection.

FIG. 9 illustrates an example of the defect detection system 506 utilizing the segmentation model 508 to evaluate an image 902 depicting an object 904 that is the second type of object where the more dissimilar an object region area is to a convex hull area (e.g., the ratio not exceeding the threshold, and thus having low convexity), the more likely the object 904 has the defect. In this example, the defect detection system 506 may determine that the object 904 is defective 912 based upon the object 904 comprising a chip of missing material at a top left corner of the object 904.

In some embodiments, alignment of a first object with respect to a second object may be determined and used to detect a defect (e.g., whether a label has been installed in a correct location). The segmentation model 508 may be used to detect an outline of the first object, such as an outline of the label. A second segmentation model may be used to detect an intersection outline of an intersection between where the first object intersects the second object (e.g., where the label has been installed on a bottom side of a laptop). In this way, two different models are used on two different objects. The outputs of the segmentation model 508 (e.g., the outline of the first object such as the label) and the second segmentation model (e.g., the intersection outline of the intersection between where the first object intersects the second object such as where the label is affixed to the bottom side of the laptop) may be used to determine whether there is a defect corresponding to misalignment of the first object with respect to the second object (e.g., the label does not align correctly with the bottom of the laptop).

Figure 10:
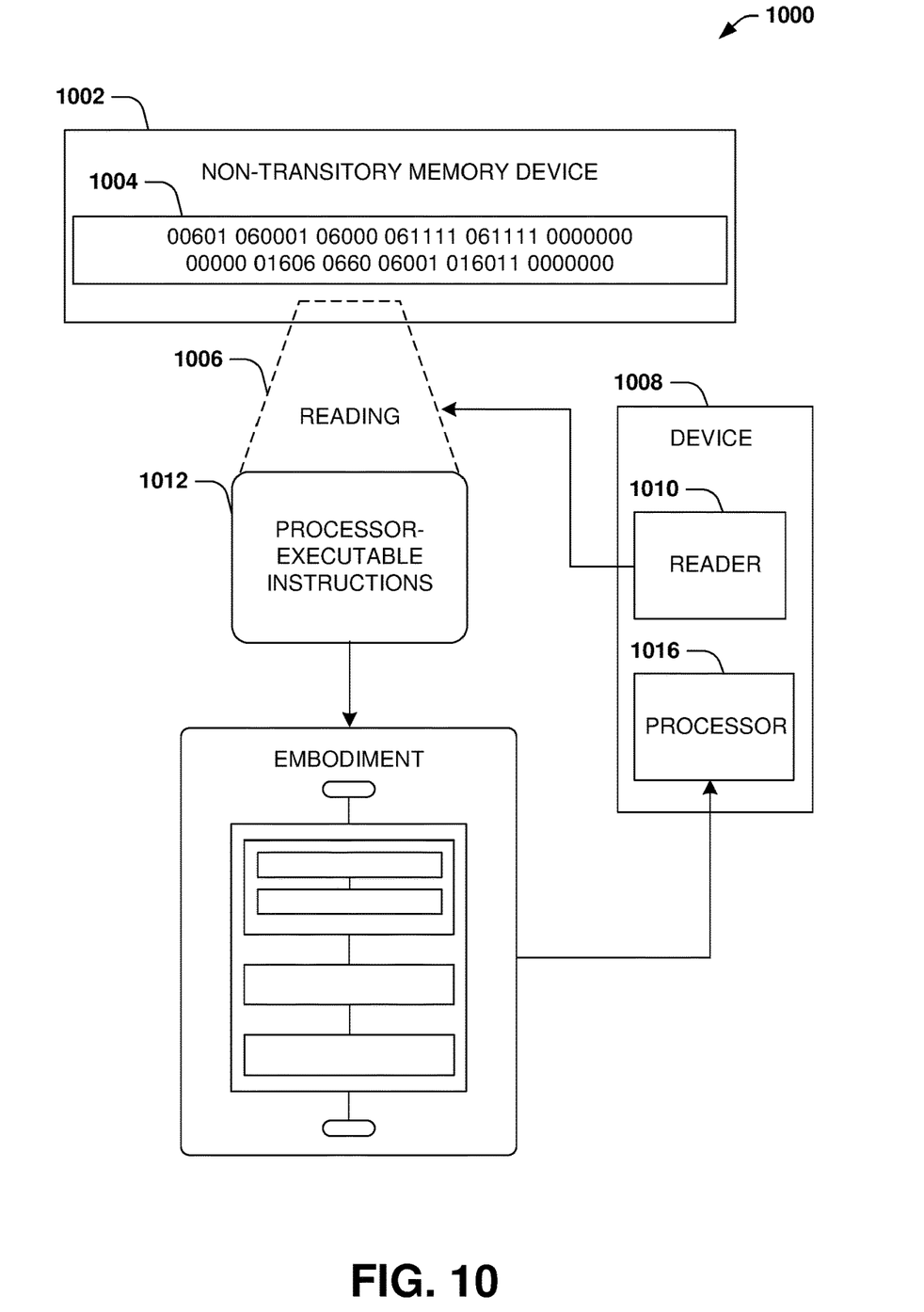
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 400 of FIG. 4, for example. In some embodiments, the processor-executable instructions 1012 are configured to cause implementation of a system, such as at least some of the example systems 500, 600, 700, 800, and 900 of FIGS. 5-9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      receiving an image depicting an object for evaluation to determine whether the object has a defect;
      inputting the image into a segmentation model to generate a segmentation mask identifying an object region of interest of the object;
      calculating an object region area of the object region of interest;

calculating a convex hull area of a convex hull encompassing the object region of interest;
determining a ratio of the object region area of the object region of interest to the convex hull area of the convex hull encompassing the same object region of interest; and
comparing the ratio to a threshold to determine whether the object has the defect or does not have the defect.

2. The method of claim 1, comprising:
in response to detecting that the object has the defect, generating and displaying a description of the defect.

3. The method of claim 1, comprising:
in response to detecting that the object has the defect, generating and displaying instructions for how to address the defect.

4. The method of claim 1, comprising:
in response to detecting that the object has the defect, marking the object as defective and facilitating replacement of the object.

5. The method of claim 4, comprising:
applying image augmentation to a training image to generate a plurality of augmented training images; and
training the segmentation model utilizing the augmented training images.

6. The method of claim 5, comprising:
applying the segmentation model to the augmented training images to generate predicted segmentation masks for the augmented training images; and
applying the image augmentation to ground truth segmentation masks for training the segmentation model.

7. The method of claim 1, comprising:
performing a binary segmentation technique to train the segmentation model using sparse training data of training images labeled as either having the defect or not having the defect.

8. The method of claim 1, comprising:
in response to determining that the defect is a first type of defect and the object is a first type of object where the more similar the object region area is to the convex hull area, the more likely the object has the defect, determining that the object has the defect within the object region of interest based upon the ratio exceeding the threshold.

9. The method of claim 8, wherein the first type of object comprises a screw head and the first type of defect corresponds to a stripped screw head.

10. The method of claim 8, comprising:
in response to determining that the defect is a second type of defect and the object is a second type of object where the more dissimilar the object region area is to the convex hull area, the more likely the object has the defect, determining that the object does not have the defect within the object region of interest based upon the ratio exceeding the threshold.

11. The method of claim 10, wherein the second type of defect comprises at least one of a dent, a missing part, missing material, or a chip.

12. A non-transitory machine readable medium having stored thereon processor-executable instructions that when executed cause performance of operations, the operations comprising:
inputting an image, depicting an object for evaluation to determine whether the object has a defect, into a segmentation model to generate a segmentation mask identifying an object region of interest of the object;
calculating an object region area of the object region of interest;
calculating a convex hull area of a convex hull encompassing the object region of interest;
determining a ratio of the object region area of the object region of interest to the convex hull area of the convex hull encompassing the same object region of interest; and
comparing the ratio to a threshold to determine whether the object has the defect or does not have the defect.

13. The non-transitory machine readable medium of claim 12, wherein the operations comprise:
implementing a two-pass model training technique to train the segmentation model, comprising:
performing, using the segmentation model, a first pass upon the image to estimate a region of a gap depicted by the image, wherein the image has a first resolution;
generating a cropped image based upon the region, wherein the cropped image has a second resolution larger than the first resolution of the image; and
performing, using the segmentation model, a second pass upon the cropped image to generate a prediction at a pixel level as to whether pixels belong to the region of the gap.

14. The non-transitory machine readable medium of claim 13, wherein the two-pass model training technique trains the segmentation model to identify the defect as corresponding to the object not being connected to another object.

15. The non-transitory machine readable medium of claim 12, wherein the operations comprise:
utilizing the segmentation model to detect an outline of the object; and
utilizing a second segmentation model to detect an intersection outline of an intersection between the object and another object.

16. The non-transitory machine readable medium of claim 15, wherein the operations comprise:
utilizing outputs of the segmentation model and the second segmentation model to determine the defect as corresponding to a misalignment of the object with respect to the other object.

17. A computing device comprising:
a processor; and
memory comprising processor-executable instructions that when executed by the processor cause performance of operations, the operations comprising:
inputting an image, depicting an object for evaluation to determine whether the object has a defect, into a segmentation model to identify an object region of interest of the object;
calculating an object region area of the object region of interest;
calculating a convex hull area of a convex hull encompassing the object region of interest;
determining a ratio of the object region area of the object region of interest to the convex hull area of the convex hull encompassing the same object region of interest; and
comparing the ratio to a threshold to determine whether the object has the defect or does not have the defect.

18. The computing device of claim 17, wherein the operations comprise:
applying image augmentation to a training image to generate a plurality of augmented training images; and
training the segmentation model utilizing the augmented training images.

19. The computing device of claim 18, wherein the operations comprise:

applying the segmentation model to the augmented training images to generate predicted segmentation masks for the augmented training images; and applying the image augmentation to ground truth segmentation masks for training the segmentation model.

20. The computing device of claim 17, wherein the operations comprise:

in response to detecting that the object has the defect, controlling a machine to at least one of discard the object, replace the object with a replacement object, or correct the defect.

* * * * *